A. RASMUSSEN.
POWER HACKSAW MACHINE.
APPLICATION FILED MAR. 19, 1917.
1,253,421.
Patented Jan. 15, 1918.
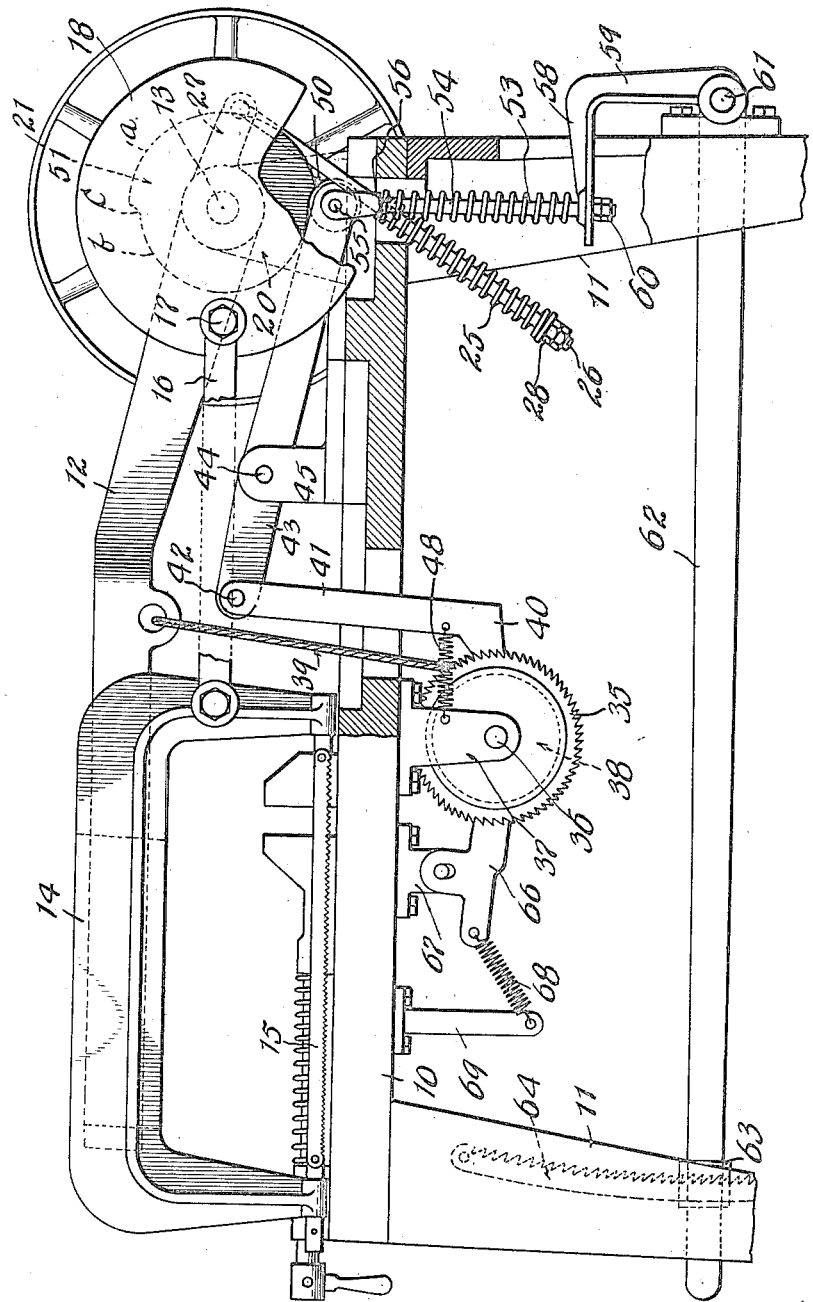
Inventor:-
Andrew Rasmussen:-
By William L. Hall
Atty.

UNITED STATES PATENT OFFICE.

ANDREW RASMUSSEN, OF RACINE JUNCTION, WISCONSIN.

POWER HACKSAW-MACHINE.

1,253,421.

Specification of Letters Patent.   Patented Jan. 15, 1918.

Original application filed February 14, 1916, Serial No. 78,148. Divided and this application filed March 19, 1917. Serial No. 155,711.

*To all whom it may concern:*

Be it known that I, ANDREW RASMUSSEN, a citizen of the United States, and a resident of Racine Junction, in the county of Racine and State of Wisconsin, have invented certain new and useful Improvements in Power Hacksaw-Machines; and I do hereby declare that the following is a full, clear, and exact description thereof, reference being had to the accompanying drawings, and to the characters of reference marked thereon, which form a part of this specification.

This invention relates to improvements in hack saws, and refers more particularly to an improved means to feed the saw blade toward the work during the cutting stroke thereof and to release it from the work during the non-cutting stroke, so as to thereby avoid wear and to facilitate the cooling of the saw blade during the non-cutting stroke.

My improvements are herein shown as applied to the type of hack saw illustrated in my application for U. S. Letters Patent, Serial No. 78148, filed February 14, 1916, of which this application is a division.

The present improvements relate to a special form of dog and ratchet mechanism by which the feed movement of the saw is controlled, and in accordance with the present invention the ratchet member has the form of a disk having peripheral ratchet teeth and is connected to the saw guide frame through the medium of a cable or like flexible connection that is wound about and attached to a drum which rotates with the ratchet member.

The figure of the drawing is a partial side elevation and partial section of a hack saw machine embodying my invention.

The frame of the saw consists of a horizontal table 10 having suitably located openings therein for the passage of operative parts of the machine and which is supported on legs 11, 11. 12 designates a vertically swinging saw frame guide and support that is pivotally mounted at its rear end on the main drive shaft 13 of the machine and supports at its forward end the usual sliding saw frame 14, between the legs of which is stretched a hack saw blade 15.

The reciprocating saw frame 14 is connected by a pitman 16 to a suitable crank actuated by the shaft 13, consisting in this instance of an eccentrically disposed crank pin 17 of a crank disk 18 that is fixed to said shaft 13. Said shaft 13 is mounted in suitable bearings 20, which rise from the rear end of the table 10, and the shaft is provided at one end with a belt pulley 21.

The weight of the saw frame and guide will be overbalanced around its pivot 13 so as to tend to raise the saw frame and saw when no feed pressure is exerted thereon, either by means of a weight or spring. As herein shown said overbalancing effect is produced by a spring 25 which surrounds a rod 26 that is loosely connected at one end to a tail piece 27 of the guide 12 and is provided at its other end with a shoulder 28, between which and a downwardly facing surface on the frame 10 said spring 25 is interposed. Said shoulder 28 constitutes part of, or is associated with an adjusting nut which is screw threaded to the rod, whereby the overbalancing pressure of the spring 25 may be delicately adjusted. Obviously a weight suitably applied to the tail piece 27, in the same general manner as shown in my aforesaid prior patent, may effect the same general result, but the spring is preferable, especially in the larger sizes of sawing machines.

The feed mechanism constituting the present invention is made as follows:—

35 designates a disk which is mounted to rotate on shaft 36 which is carried by depending brackets 37 of the machine frame. Rotating with said disk and fixed thereto as herein shown is a drum 38, shown in dotted lines, on which is adapted to be wound a cable 39 that is attached to the saw frame and supporting guide 12, the cable being attached at its other end to the drum on which it is wound.

40 designates a feed dog which engages the teeth of said ratchet disk, and which is formed on the lower end of a bar 41 that is lcosely connected or hinged at 42 to the forward end of a cam controlled feed lever 43. Said lever is pivoted at 44 to a standard 45, which rises from the base or bed plate 10 of the machine. The dog may be weighted so as to be normally pressed toward the rotating disk, but preferably a light spring 48 is applied for this purpose. Said spring is shown as attached at one end to the dog 40 and at its other end to the bracket 37. The rear end of the lever 43 carries a bearing roller 50 which engages the periphery of a cam 51 that is fixed to and rotates with the shaft 13, or may be otherwise suitably driven therefrom. The periphery of the cam 31 is divided into two equal parts, to wit:—a higher part or track *a* and a lower part or track *b* connected by oblique or cam portions *c*. The bearing roller 50 carried by the rear end of the lever 43 is normally pressed toward or against the periphery of the cam 51 by means permitting said latter end of the lever to yield backwardly away from the cam. This may be effected either through the action of a spring or weight; a spring 53 being herein employed. The spring 53 surrounds a rod 54 that is loosely connected at 55 to the lever 43 and said spring is interposed between a shoulder 56 on said rod and one arm 58 of an L-shaped lever 59, that is perforated for the passage of said rod. Said rod is screw threaded to receive a nut 60 to prevent detachment of the rod from the lever. The lever is pivoted at 61 to the machine frame and a spring adjusting lever 62, fixed to lever 59, is carried to the front end of the machine and is there provided with a suitable latch 63 which coöperates with a locking bar 64. By this arrangement the feed mechanism may be adjusted to press the saw blade more or less lightly against the work.

When sawing relatively soft metals the pressure of the spring 53 may be so adjusted as to press the bearing roller 50 of the lever 43 into contact with the lower track *b* of the cam 51 so as to obtain the maximum cut of the saw. The contact of the roller with this portion of the cam limits the feed movement of the lever in each operation of the saw. When cutting harder metals said spring will be adjusted to press the saw more lightly against the work. When the bearing roller is engaged with the higher track *a* of the cam the forward end of the lever 43 is raised to release the feed dog from the ratchet member 35 and to permit the saw frame to be raised under the action of spring 25.

Operating in connection with the feed dog is a stop dog 66, which, as herein shown, engages the circular ratchet member on the side thereof remote from feed dog. However, as in the construction described in my aforesaid application, it is located adjacent to the feed dog. Said stop dog 66 is pivoted to a bracket 67 which depends from the bed plate 10 and is placed under the action of a spring 68 which is attached at one end to the tail piece of the dog and is attached at its other end to a fixed member 69 which depends from said bed plate.

The function of the stop dog is to limit the rising movement of the saw frame during the non-cutting stroke of the saw and at a time when the feed dog is released from the ratchet member so that when said feed dog is again depressed through its feed stroke the teeth thereof engage the teeth of the ratchet member above those engaged in the earlier feed movements of the dog with the result of progressively feeding the saw to its work. This feed movement is a yielding one due to the balancing of the feed operations between the springs 25 and 53. When cutting hard material the feed dog may not be raised at each release thereof from the ratchet tooth last engaged to carry it into engagement with the next higher ratchet tooth but may be operated through two more feed strokes on one ratchet tooth. However, the stop or check dog prevents the rising of the saw under the action of spring 25 to such height as to cause the ratchet tooth last engaged to pass under the dog, such as would occur if the stop dog were not present. The dog is hinged to the machine frame by means permitting slight lost motion, as by elongating the aperture through which the hinge pin for the dog extends. The rising of the saw blade from the bottom of the saw cut need not be great but only sufficient to allow complete clearance of the saw blade teeth from the bottom of the saw cut. I have found in practice that sixteen pitch teeth on the ratchet is sufficient to produce the desired clearance.

Both the feed and check or stop dogs may be simultaneously released in any suitable manner by some means equivalent to that shown in my aforesaid application.

The illustrated embodiment of my invention is capable of some variation within the spirit and scope of the claims hereto appended and the invention is not intended to be limited to the particular details shown except as the same are made subject to specific claims.

I claim as my invention:—

1. Feed means for power hack saw machines comprising, in combination with a reciprocating and raisable and lowerable saw frame and its saw, means acting on the frame tending to lift the saw from its work during the non-cutting stroke and means to feed the saw toward the work during the cutting stroke comprising a rotative circular ratchet member suitably connected to the saw frame and feed and stop dogs coöperating with said ratchet member.

2. Feed means for power hack saw machines comprising, in combination with a reciprocating and raisable and lowerable saw frame and its saw, means acting on the frame tending to lift the saw from its work during the non-cutting stroke and means to feed the saw toward the work during the cutting stroke comprising a rotative circular ratchet member suitably connected to the saw frame, a feed dog acting on the ratchet member, with cam means for controlling the same, and means to limit the lifting movement of the saw when the fed dog is released from the ratchet member.

3. Feed means for power hack saw machines comprising, in combination with a reciprocating and raisable and lowerable saw frame and its saw, means acting on the frame tending to lift the saw from its work during the non-cutting stroke and means to feed the saw toward the work during the cutting stroke comprising a rotative circular ratchet member suitably connected to the saw frame, a feed dog coöperating with said ratchet member, with resiliently applied cam controlled means to control it and means for limiting the rising of the saw from the work when the fed dog is disengaged from the ratchet member.

4. Feed means for power hack saw machines comprising, in combination with a reciprocating and raisable and lowerable saw frame and its saw, means acting on the frame tending to lift the saw from its work during its non-cutting stroke, and means to feed the saw toward the work during the cutting stroke comprising a rotative circular ratchet member suitably connected to the saw frame, a feed dog to engage said ratchet member, a lever on which said feed dog is supported, with means for holding the dog yieldingly against the ratchet member, a cam for controlling said lever, a spring tending to force said lever toward said cam, and means to limit the rising of the saw from its work when the feed dog is operatively disengaged from the ratchet member.

5. Feed means for power hack saw machines comprising, in combination with a reciprocating and raisable and lowerable saw frame and its saw, means acting on the frame tending to lift the saw from its work during its non-cutting stroke and means to feed the saw toward the work during the cutting stroke comprising a rotative circular ratchet member suitably connected to the saw frame, a feed dog to engage said ratchet member, a lever on which said feed dog is supported, a cam for controlling said lever, a spring tending to force the lever toward its controlling cam, means to vary the force of the spring acting on said lever, and means to limit the rising of the saw from its work when the fed dog is operatively disengaged therefrom.

6. Feed mechanism for power hack saws comprising, in combination, a saw carrying frame normally overbalanced away from the work, a rotative ratchet member, a drum turning with said ratchet member, a cable fixed to and wound on the drum and connected to said frame, a feed dog operatively engaging said rotative ratchet member, with means for controlling the feed movement of the dog, and means to prevent reverse rotation of the ratchet member when the feed dog is operatively disengaged therefrom.

7. Feed mechanism for power hack saws comprising, in combination, a saw carrying frame normally overbalanced away from the work, a rotative ratchet member, a drum turning with said ratchet member, a cable fixed to and wound on the drum and connected to said frame, a feed dog operatively engaging said rotative ratchet member, with means for controlling the feed movement of the dog, and a check dog coöperating with the ratchet member to prevent reverse rotation thereof when the feed dog is operatively disengaged from the ratchet member.

In witness whereof I claim the foregoing as my invention, I herein append my signature in the presence of two witnesses at Racine, Wisconsin, this 27th day of February, 1917.

ANDREW RASMUSSEN.

Witnesses:
 THOS. ALLEN,
 H. N. BACON.

Copies of this patent may be obtained for five cents each, by addressing the "Commissioner of Patents, Washington, D. C."